Figure 1:
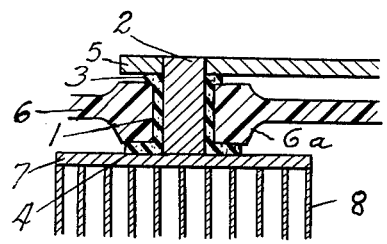

Feb. 15, 1966   F. BRONSTERT   3,235,411
SEALING TERMINAL POSTS IN ELECTROCHEMICAL CELL COVERS
Filed Nov. 13, 1962

INVENTOR:
FRANZ BRONSTERT

BY
AGENT 3,235,411
SEALING TERMINAL POSTS IN ELECTRO-
CHEMICAL CELL COVERS
Franz Bronstert, Bad Homburg von der Hohe, Germany,
assignor to Varta Aktiengesellschaft, Frankfurt am
Main, Germany, a corporation of Germany
Filed Nov. 13, 1962, Ser. No. 236,977
Claims priority, application Germany, Nov. 14, 1961,
A 38,804
3 Claims. (Cl. 136—168)

The present invention relates to improvements in sealing the terminal posts of cell plate sets of electrochemical cells, such as storage batteries, at the point where they pass through the cell cover. It uses elastic gaskets, such as of electrolyte resistant plastic and preferably of soft rubber, for sealing the holes of the cover through which the terminal posts pass and provides most effective sealing, particularly in the case of molded synthetic resin, i.e. plastic covers.

Various forms and materials have been proposed for seals of the indicated type, representative seals being shown, for instance, on page 66 of "Storage Batteries" by George Wood Vinal, Fourth Edition, John Wiley & Sons, Inc., New York, 1955.

Ribbed lead insert bushings have been used for this purpose, for example, in connection with hard rubber covers and these bushings were soldered to the terminal posts and post connectors to provide a good seal. This type of seal is difficult and correspondingly expensive to produce, however, and it cannot be used with synthetic resin covers because the soldering heat would burn the adjacent portions of the plastic cover. Also, the heat expansion coefficients of plastics used for this purpose, such as polystyrene, and lead differ so greatly that the tight engagement of lead and plastic would cease even at normal batery operating temperatures so that the seal would begin to leak.

It has also been proposed to use rubber gaskets with plastic covers. For instance, a rubber sleeve may be inserted into the cylindrical cover hole and a conically shaped terminal post passing through the hole compresses the gasket to provide the seal. This and similar seals have considerable disadvantages. Since the battery plate sets are not always of the same height and certain tolerances in respect of the container height also are unavoidable, the compression of the gasket, which essentially depends on these parameters, is uneven and leaks may, therefore, develop.

The present invention overcomes these shortcomings and provides a superior sealing arrangement in an electrochemical cell which comprises a cover and a terminal post passing outwardly through the cover. This arrangement includes a gasket of an elastic material, preferably soft rubber, and the gasket surrounds the terminal post and has a flange at each end. The flanges engage the cover and the flange beneath the cover is of larger diameter than the flange above the cover. The terminal post and the surrounding gasket sleeve are preferably cylindrical. This type of sealing gasket is particularly useful in conjunction with a molded plastic cover, such as a polystyrene cover but, of course, is not limited thereto.

The sealing method of this invention comprises the steps of supporting a set of cell plates, placing an elastic gasket with an end flange over and about the terminal post of the plate set, with the end flange engaging the connecting strap of the set, placing the cell cover over the terminal post, placing a terminal post connector over the terminal post in engagement with an outwardly extending portion of the gasket sleeve, exerting a controlled pressure upon the connector to bend over the outwardly extending gasket sleeve portion and form it into a flange lying between the cover and the connector and permanently connecting the connector with the terminal post. The gasket sleeve surrounds the terminal post, and the cover hole, through which the terminal post passes, surrounds the gasket sleeve while the gasket end flange lies between the connecting strap and the cover. The pressure is so controlled as to be sufficient to compress the elastic gasket sleeve and flanges whereby, upon permanent connection of the connector with the terminal post, the gasket is maintained in its sealing position under pressure.

Figure 2:
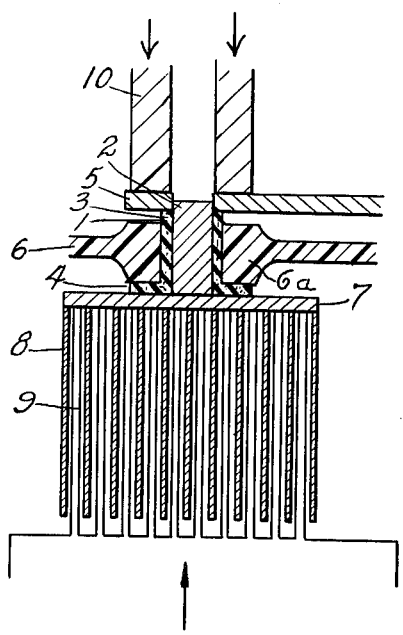

The above and other advantages and features of the invention will become more apparent in the following detailed description of one specific embodiment thereof, taken in conjunction with the accompanying drawing wherein FIG. 1 is a vertical cross section of a sealing arrangement according to the invention; and FIG. 2 is a similar view showing the method of producing the seal of FIG. 1.

In the drawing, like reference numerals indicate like parts in both figures. The invention is shown applied to an otherwise conventional storage battery, only those portions of the battery being shown which are pertinent to the invention.

As illustrated, the sealing gasket consists of a bushing or sleeve 1 having a respective flange 3 and 4 at its respective ends. The gasket material must be elastic or deformable under pressure, soft rubber being a very useful material for this purpose. As is conventional, the electrochemical cell, which is a storage battery cell in the illustrated embodiment, comprises a battery plate set of one polarity, the plate set of the opposite polarity being similar in structure and, therefore, not shown for the sake of clarity. The cell plate set includes electrodes or plates 8 interconnected by connecting strap 7 and having a terminal post 2 affixed thereto. All of this structure is entirely conventional and, in lead-acid batteries, for instance, the plates, the connecting strap, and the terminal post will be of lead or lead alloy, being soldered together so as to form a unit. Preferably, as shown, the terminal post is cylindrical.

The battery cell cover is shown at 6 and may consist of a molded synthetic resin, such as polystyrene. In the illustrated embodiment, the cover has a thickened annular portion 6a surrounding the cover hole through which the terminal post 2 passes. The gasket sleeve 1 lies between the terminal post, which it surrounds, and the cover hole, with the flange 4 lying between the connecting strap 7 and the thickened portion 6a of the cover 6. Placed over the terminal post is the terminal post connector 5 which is permanently connected to the terminal post, for instance, by welding or soldering it to the post in a conventional manner. The connector is made of any conductive material, preferably metal, such as lead, copper, or the like. The end flange 3 of the gasket lies between the connector and the thickened annular portion of cover 6 and, as indicated in the drawing, the flange 4 is of larger diameter than flange 3.

It is a major advantage of this sealing arrangement that the two end flanges securely seal the cover hole since they overlap the hole and engage the cover. The elasticity of the gasket tends to equalize heat disparities between the cell cover and the terminal post. Since the rubber gasket is a heat insulator, it protects the plastic cover from the soldering or welding heat when the connector 5 is permanently connected with the terminal post, the upper flange 3 additionally protecting the rim of the cover hole from being burned. Also, the entire elastic gasket being under compression, it provides an exceedingly tight seal.

A preferred sealing method is illustrated in FIG. 2.

The method is very simple and, therefore, economical while assuring a tight and permanent seal thus satisfactorily preventing leakage of the electrolyte from the cell and providing a seal which will not work loose in the cover during operation of the battery.

As shown, the battery plate set 8 is supported from below during the application of the seal before it is placed into the battery container holding the electrolyte. While the plate set support may be any suitable flat plane, such as a work table, a preferred support is shown in FIG. 2 to consist of a forked support 9 having tines extending upwardly between adjacent plates 8 so as to support portions of the connecting strap between the plates from below.

After the plate set is thus securely placed in position, the elastic gasket sleeve 1 is placed over the terminal post 2, with its large, pre-formed end flange 4 engaging the connecting strap. The cover 6 is then placed over the terminal post, with its hole fitting over the gasket sleeve and the gasket flange 4 lying between the connecting strap and the cover. The terminal post connector 5 is then placed over the terminal post in engagement with an outwardly extending portion of the gasket sleeve. This extending portion will normally be of the order of 0.5 mm. to a few millimeters only but, at any rate, it is shorter than lower flange 4. After the indicated cell parts have been assembled in this manner, a controlled pressure is exerted upon the connector, for instance, by a ram 10. The pressure is accurately controlled so as to bend over the outwardly extending gasket sleeve portion and to form it into flange 3 (see FIG. 1), as well as to compress the elastic gasket sleeve and flanges. When a soft rubber gasket is used, a pressure in the range of one atm. gauge to 1000 atm. gauge has been found sufficient for this purpose, a pressure of about 500 atm. gauge being preferred. Care must be taken, of course, not to crush the plastic cover by the applied compression force.

After the gasket has been thus compressed, the connector 5 is welded or soldered to the terminal post in any suitable manner, as is well known in the art, while keeping the assembly under pressure. When the connector has thus been permanently connected with the terminal post, the gasket is maintained in its sealing position under compression. After the plate sets have thus been sealed into the cell cover, the entire unit is placed into a cell container which holds an electrolyte, as is also well known in the art and forms no part of the present invention.

The constant pressure under which the seal is formed and the practically uniform pressure throughout the gasket produces a more secure seal than has heretofore been possible. There is no appreciable fatigue in the gasket because it is maintained under constant pressure and no appreciable work is needed to maintain its elasticity. Furthermore, since only a very minor portion of the rubber gasket is exposed to air and other oxidizing agents do not contact the gasket at all, the gasket does not noticeably age. The largest possible part of the gasket is used for sealing and the smallest possible part thereof is exposed to corrosive influences.

In a preferred sealing method according to this invention, the cover is first pressed against the connecting strap of the plate set to compress flange 4 therebetween, whereupon the terminal post connector is placed on the post and the controlled pressure is exerted to form the flange 3 and compress the entire gasket. This produces an even more uniform compression of the gasket and thus makes the seal more dependable.

While the present invention has been described in connection with specific embodiments thereof, it will be clearly understood that many variations and modifications may occur to the skilled in the art, particularly after benefiting from the present teaching, without departing from the spirit and scope of this invention, as defined in the appended claims.

I claim:
1. A method of sealing terminal posts of an electrochemical cell in corresponding holes in a cell cover through which the posts pass, comprising the steps of supporting a set of cell plates including a connecting strap and one of said terminal posts projecting from said strap; placing an elastic gasket consisting of a sleeve and an end flange over said one terminal post, said end flange forming an integral part of said gasket, the sleeve surrounding the post and the end flange engaging the connecting strap; placing the cover over the terminal post, with a respective one of the cover holes surrounding the gasket sleeve and the gasket end flange lying between the connecting strap and the cover, the gasket sleeve extending outwardly beyond the cover; placing a terminal post connector over the terminal post in engagement with the outwardly etxending gasket sleeve; exerting a controlled pressure upon the connector sufficient to bend over said outwardly extending gasket sleeve portion and form it into a flange lying between the cover and the connector, and to compress the elastic gasket sleeve and flanges; and permanently welding the connector to the terminal post whereby the gasket is maintained in its sealing position under pressure.

2. The method of claim 1, wherein portions of the connecting strap between the cell plates are supported from below.

3. The method of claim 1, wherein the cover is first pressed against the set of cell plates to compress the end flange between the connecting strap and the cover first, whereupon the connector is placed over the terminal post and the controlled pressure is exerted thereupon.

References Cited by the Examiner

UNITED STATES PATENTS

| | | | |
|---|---|---|---|
| 1,283,779 | 11/1918 | Hutchison et al. | 136—168.3 |
| 1,376,932 | 5/1921 | Galloway | 136—168.1 |
| 1,503,070 | 7/1924 | Snyder | 136—168 |
| 1,599,836 | 9/1926 | Owen | 136—168.3 |
| 2,926,210 | 2/1960 | Sturges | 136—168 |

WINSTON A. DOUGLAS, *Primary Examiner.*

JOHN H. MACK, *Examiner.*